United States Patent
Nemani et al.

(10) Patent No.: US 6,327,552 B2
(45) Date of Patent: *Dec. 4, 2001

(54) METHOD AND SYSTEM FOR DETERMINING OPTIMAL DELAY ALLOCATION TO DATAPATH BLOCKS BASED ON AREA-DELAY AND POWER-DELAY CURVES

(75) Inventors: Mahadevamurty Nemani, Sunnyvale; Franklin Baez, San Jose, both of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/474,008

(22) Filed: Dec. 28, 1999

(51) Int. Cl.[7] ........................................................ G06F 15/18
(52) U.S. Cl. .................................. 703/2; 703/14; 703/15; 703/18; 703/19; 703/20
(58) Field of Search .................................... 703/14, 15, 16, 703/17, 18, 19, 2, 20

(56) References Cited

U.S. PATENT DOCUMENTS

| | | | |
|---|---|---|---|
| 5,500,805 | * | 3/1996 | Lee et al. .............................. 364/491 |
| 5,555,201 | * | 9/1996 | Dangelo et al. ..................... 364/489 |
| 5,612,892 | * | 3/1997 | Almulla ............................... 364/489 |
| 5,619,420 | * | 4/1997 | Breid .................................... 364/491 |
| 5,666,228 | * | 9/1997 | Jones et al. ........................... 364/490 |
| 5,768,145 | * | 6/1998 | Roethig ................................ 364/488 |
| 5,774,367 | * | 6/1998 | Reyes et al. ......................... 364/488 |
| 5,835,380 | * | 11/1998 | Roethig ................................ 364/488 |
| 5,838,947 | * | 11/1998 | Sarin .................................... 395/500 |
| 5,867,397 | * | 2/1999 | Koza et al. ..................... 395/500.35 |
| 5,880,967 | * | 3/1999 | Jyu et al. ......................... 395/500.07 |
| 5,889,685 | * | 3/1999 | Ramachandran ................ 395/500.27 |
| 5,910,898 | * | 6/1999 | Johannsen ....................... 395/500.07 |
| 5,917,729 | * | 6/1999 | Naganuma et al. ............ 395/500.09 |
| 5,926,396 | * | 7/1999 | Ohara .................................. 364/490 |

OTHER PUBLICATIONS

Bharat, Krishna, et al., "Circuit Design Environment and Layout Planning," *Intel Technology Journal*, 1st Quarter 1999.

Chan, Tim, et al., "Challenges of CAD Development for Datapath Design," *Intel Technology Journal*, 1st Quarter 1999.

(List continued on next page.)

*Primary Examiner*—Kevin J. Teska
*Assistant Examiner*—William Thomson
(74) *Attorney, Agent, or Firm*—Kenyon & Kenyon

(57) ABSTRACT

A method, system and computer program product for automatically determining optimal design parameters of a subsystem to meet design constraints. The subsystem comprises a plurality of circuits. The optimal design parameters are determined by performing a parameter-delay curve optimization of the subsystem design parameters. Specifically, an embodiment of the present invention provides a method and/or computer program product for determining optimal values for the design parameters of a circuit block, which result in optimally assigned delay targets for datapath blocks at the minimum power/area point. The problem/solution space is extended to solve the problem of figuring out the best possible implementation, for example, static vs dynamic, for each datapath block. Based on parameter functions, which relate to the design parameters for circuits in the circuit block, the design parameters are optimized to satisfy the design constraints. In one embodiment, the design parameters include power and delay and the parameter functions are power-delay curves.

15 Claims, 11 Drawing Sheets

OTHER PUBLICATIONS

Nagbhushan, Veerapaneni, et al., "Nike's Software Architecture and Infrastructure: Enabling Integrated Solutions for Gigahertz Designs," *Intel Technology Journal*, 1$^{st}$ Quarter 1999.

"Computing the Entire Active Area/Power Consumption versus Delay Trade–off Curve for Gate Sizing with a Piecewise Linear Simulator", Berkelaar et al., 1994 ACM.*

"Timimg and Power Optimization by Gate Sizing Considering False Path", Chen et al., IEEE 1996.*

"Gate Sizing: a General Purpose Optimization Approach", Coudert, Synopsys Inc., IEEE 1996.*

"Path Resizing Based on Incremental Technique", Cremoux et al., IEEE 1998.*

"Optimization of Custom MOS Circuits by Transistor Sizing", Conn et al., IEEE 1996.*

"ASAP: A Transistor Sizing Tool for Speed, Area and Power Optimization of Static CMOS Circuits", Dutta et al., IEEE 1994.*

"Gate Sizing in MOS Digital Circuits with Linear Programming ", Berkelaar et al., IEEE 1990.*

"Interleaving Buffer Insertion and Transistor Sizing into a Single Optimization", Jiang et al., IEEE 1998.*

"Optimization of Standard Cell Libraries for Low Power, High Speed or Minimal Ara Designs", Fisher et al., IEEE 1996.*

"Gate Sizing for Constrained Delay/Power/Area Optimization", Coudert, IEEE 1997.*

"Computing the Entire Active Area/Power Consumption versus Delay Tradeoff Curve for Gate Sizing with a Piecewise Linear Simulator", Berkelaar et al. IEEE 1996.*

"Real Area Power Delay Trade Off in the EUCLID Logic Synthesis System", Berkelaar et al. IEEE 1990.*

* cited by examiner

US 6,327,552 B2

METHOD AND SYSTEM FOR DETERMINING OPTIMAL DELAY ALLOCATION TO DATAPATH BLOCKS BASED ON AREA-DELAY AND POWER-DELAY CURVES

FIELD OF THE INVENTION

The present invention relates to computer systems. In particular, the invention relates to circuit design techniques and related computer-aided design ("CAD") software tools.

BACKGROUND

1. Introduction

While microprocessor speeds have historically doubled with every new processor generation, power consumption of circuit blocks in the microprocessors has gone up by six orders of magnitude during each new processor generation. Even with processor operating voltage reduction and capacitance reduction coming from new manufacturing processes which shrink transistor sizes, chip power consumption is still growing at a rate of three orders of magnitude per processor generation. This growth in power consumption is largely due to an increased use of on chip hardware to improve parallelism and improve microprocessor performance. In addition, to get extra performance on certain critical timing paths, device sizes are being increased to get shorter delays at the circuit level. However, size optimization of all transistor sizes in a given design is very time consuming, and often, the penalty of upsizing transistors to get performance boosts comes at the expense of a much larger increase in circuit power consumption.

To achieve further performance increases in very critical arithmetic and control circuitry, designers are converting a larger portion of the static lower power portion of the chip to more power hungry dynamic (which includes domino) blocks to attain the very aggressive delay specifications dictated by the chip architecture. Therefore, the use of dynamic logic is becoming more prevalent and an increasing part of microprocessor circuit designs. It has been demonstrated that dynamic or domino logic consumes three times more power than static complementary metal-oxide-semiconductor ("CMOS") designs. However, for some delay range, some domino designs can be made static at the same performance point, and power optimizations can become possible under these circumstances.

Register transfer language ("RTL") to schematic partitioning has also made the power-delay optimization problem more difficult for designers. Without proper knowledge of power-delay tradeoff points at the micro architecture level, circuit designers are forced to upsize entire blocks to meet circuit performance targets. For some designs, however, certain timing can be reallocated to adjacent blocks, and these blocks can then be concurrently downsized and upsized to further achieve a lower power design at the same original delay specification. Unfortunately, while some aspects of recalculating reallocated power designs and delays between blocks has been automated, existing systems still require the designers to manually reallocate the power designs and delays using alternate implementations of the blocks within the design. As the number of blocks and the number of possible implementations for each block both increase, so does the difficulty of manually redesigning and reallocating the power designs and delays. For example, even in a small circuit with only five blocks and three possible implementations for each block there are over two hundred and forty possible configurations of the circuit that can be created. This is too many possible combinations for a designer to manually create and then efficiently and effectively evaluate the desirability of each combination.

High chip power consumption continues to be a major limiting factor for the introduction of new microprocessor designs to the market and as the demand for faster processor operating frequencies continues to increase, chip power consumption problems have only become worse. As a result, currently used power saving techniques are being nullified by the over whelming trend in power increase.

Therefore, new Computer-Aided Design ("CAD") tools and methodologies are needed for the next generations of microprocessor designs to optimize for power-delay or area-delay or both and enable higher productivity from designers during the design cycle.

SUMMARY OF THE INVENTION

Embodiments of the present invention provide a method, system and/or computer program product for automatically determining optimal design parameters of a subsystem to meet design constraints. The subsystem comprises a plurality of circuits. The optimal design parameters are determined by performing a parameter-delay curve optimization of the subsystem design parameters.

BRIEF DESCRIPTION OF THE DRAWINGS

The features and advantages of the present invention will become apparent from the following detailed description of the present invention in which.

DETAILED DESCRIPTION

Figure 1A:
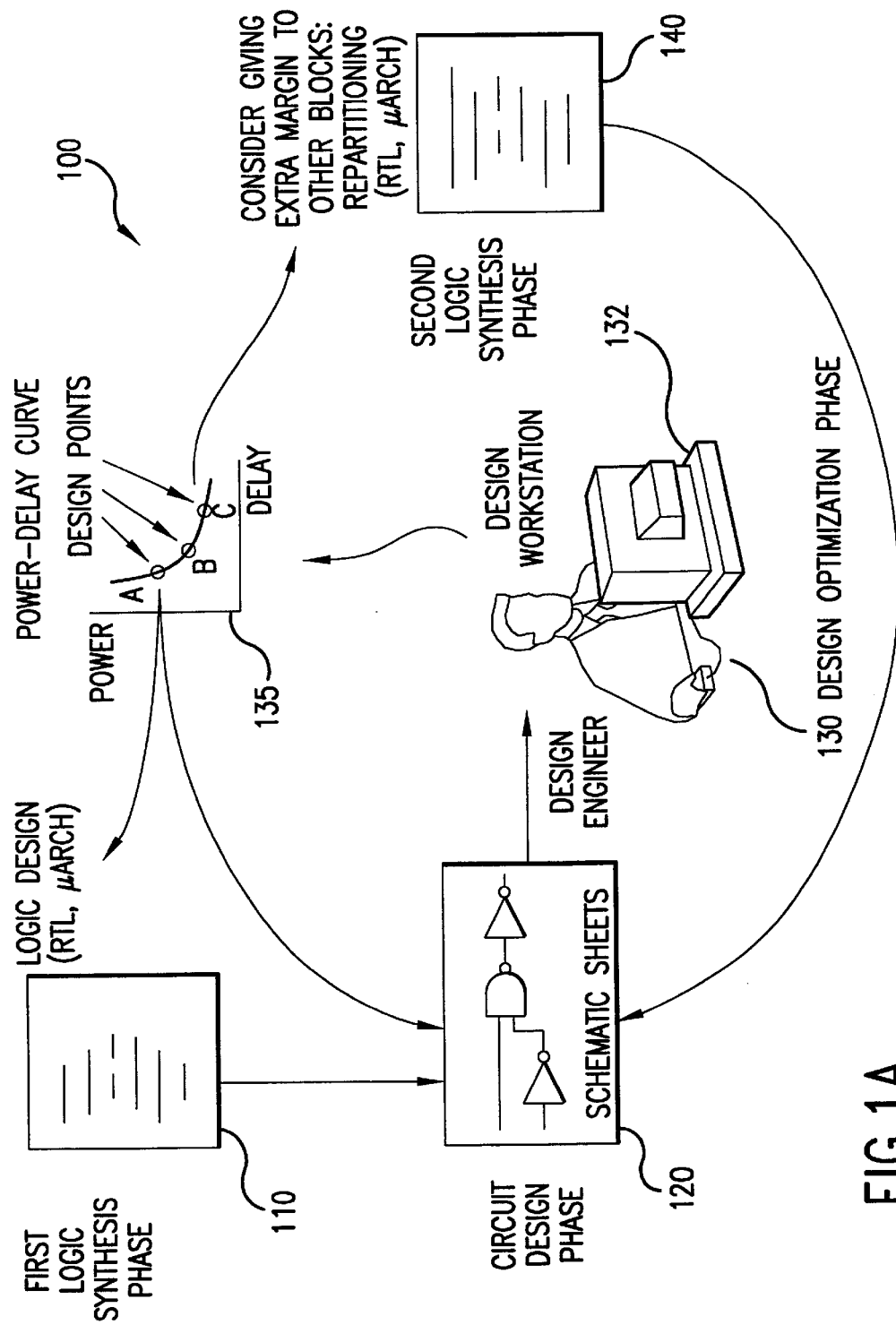
FIG. 1A is a diagram illustrating an engineering design cycle in accordance with the teachings of the invention.

Embodiments of the present invention provide a method and computer program product for determining optimal values for the design parameters of a circuit block, which result in optimally assigned delay targets for datapath blocks at the minimum power/area point. The problem/solution space is extended to solve the problem of figuring out the best possible implementations (for example, static vs. domino) for each datapath block. Based on parameter functions, which relate to the design parameters for circuits in the circuit block, the design parameters are optimized to satisfy the design constraints. In one embodiment, the design parameters include power and delay and the parameter functions are power-delay curves. The power-delay curves are generated using a timing simulator, a power estimator, and transistor sizing tools. In another embodiment, the design parameters include area and delay and the parameter functions are area-delay curves. Embodiments of the present invention provide a technique to help designers automatically perform trade-off analyses to optimize the design within the specified design constraints.

In the following description, for purposes of explanation, numerous details are set forth in order to provide a thorough understanding of the present invention. However, these specific details are not required in order to practice the present invention. In other instances, well known electrical structures and circuits are shown in block diagram form in order not to obscure the present invention.

A simple and efficient method for optimizing the design through the use of power-delay and area-delay curves to minimize chip power consumption is described herein. However, the method for optimizing is not able to automatically generate all of the possible solutions and then select the optimal solution from among all of the possible solutions.

In a circuit design, the designer, usually a design engineer, is typically faced with a number of design parameters and design constraints. The design constraints are usually dictated by the system requirements and specifications. Examples of the design constraints include propagation delay, power consumption, packaging, number of input/output ("I/O") lines, etc. The design constraints are typically imposed on one or more design parameters, while leaving other parameters to be optimized to achieve high performance. The design parameters, therefore, are divided into two parameter sets: a constraint set and an optimizing set. The "constraint set" includes constraint parameters which are the parameters that have to meet the design constraints. The "optimizing set" includes the optimizing parameters which are the parameters that need to be optimized. In an exemplary scenario, a constraint parameter is the propagation delay and an optimizing parameter is the power consumption. In another scenario, the propagation delay is the optimizing parameter and the power consumption is the constraint parameter.

The relationship between the constraint parameters and the optimizing parameters is described by a parameter function. A "parameter function" describes the variation of one parameter as a function of another parameter. For example, a parameter function may describe the variation of the power consumption as a function of the delay. The variation of one parameter as a function of another is typically caused by a configuration of the circuit such as the size of the transistors, the choice of circuit technology (for example, domino versus static), etc. A configuration of the circuit that gives rise to the particular values of the design parameters corresponds to a design point.

A system, a subsystem, a module or a functional block may consist of a number of circuits. Each circuit is characterized by a parameter function. Optimizing the design of a subsystem or functional block involves a trade-off consideration of all the parameter functions of all the individual circuits of the subsystem or functional block. For a parameter function of a given circuit, there are many design points corresponding to different circuit configurations. Therefore, optimizing a subsystem or functional block involves the selection of the design points on the parameter functions that provide the optimal values of the optimizing parameters and acceptable values of the constraint parameters. In accordance with an embodiment of the present invention provides a technique to automatically determine an optimal design based on the parameter functions using linear programming techniques.

FIG. 1A is a diagram illustrating an example of an engineering design cycle in accordance with the teachings of the invention. In accordance with an embodiment of the present invention, engineering design cycle 100 includes a first logic synthesis phase 110, a circuit design phase 120, a design optimization phase 130, and a second logic synthesis phase 140.

The first logic synthesis phase 1 10 provides the high level logic description and/or design of the circuits. In the first logic synthesis phase 110, the designer synthesizes the circuits manually or using a number of tools including Computer-Aided Design ("CAD") tools. Examples of CAD tools include hardware description language ("HDL") compilers, and schematic entry tool. The result of the first logic synthesis phase 110 includes the design in high level form such as a textual description of circuit at the behavioral level, register transfer language ("RTL"), or micro architecture.

The circuit design phase 120 receives the generated logic synthesis files to generate the synthesized circuits. The synthesized circuits may be represented by circuit schematics, a netlist of the circuits, or any other convenient form that can be further processed by additional CAD tools. Essentially, the circuit design phase 120 represents an unoptimized complete design that shows subsystems or functional blocks at the detailed implementation level for the synthesized circuits.

In FIG. 1A, the design optimization phase 130 determines the optimal values for the design parameters to meet the design constraints. In the design optimization phase 130, the design engineer uses a design workstation or a computer system 132. The computer system 132 is supported by a design environment which includes the operating system and CAD tools such as timing analyzer, power estimator, transistor sizing tool to adjust the design parameters according to the allowable design budgets. The design optimization phase 130 typically produces a number of parameter functions that relate the design parameters for the circuits. An example of such a parameter function is a power-delay curve 135. The power-delay curve 135 shows the relationship between the power consumption and the propagation delay for a particular circuit in a functional block. The power-delay curve 135 has a number of design points corresponding to different implementations or configurations of the circuit under consideration. The power-delay curve 135 provides the design engineer the basic information to optimize his or her circuit under the specified design constraints.

As shown in FIG. 1A, from the information provided by the power-delay curve 135, the design engineer modifies the circuit design according to the design points. The exemplary power-delay curve 135 has three design points A, B, and C. The design point A corresponds to a circuit implementation that has high power consumption and fast speed, representing an undesirable implementation because of excessive power consumption. The design point B corresponds to the optimal power consumption and optimal speed, also representing the best circuit implementation. The design point C corresponds to low power consumption and acceptable speed, representing a desirable implementation. If the circuit implementation is at the design point A, the design engineer will have the option to go back to the first logic synthesis phase 110 or the circuit design phase 120. If the circuit implementation is at the design point C, the design engineer will go to the second logic synthesis phase 140.

The second logic synthesis phase 140 is essentially the same as the first logic synthesis phase 110 with the exception that the design engineer now focuses more on giving the extra design margin to other circuits in the subsystem or functional block. The low power consumption at the design point C provides more margin to the power budget for other circuits. In the second logic synthesis phase 140, the design engineer modifies the circuit synthesis based on the extra margin, such as repartitioning, floor-plan editing, sizing, etc.

Figure 1B:
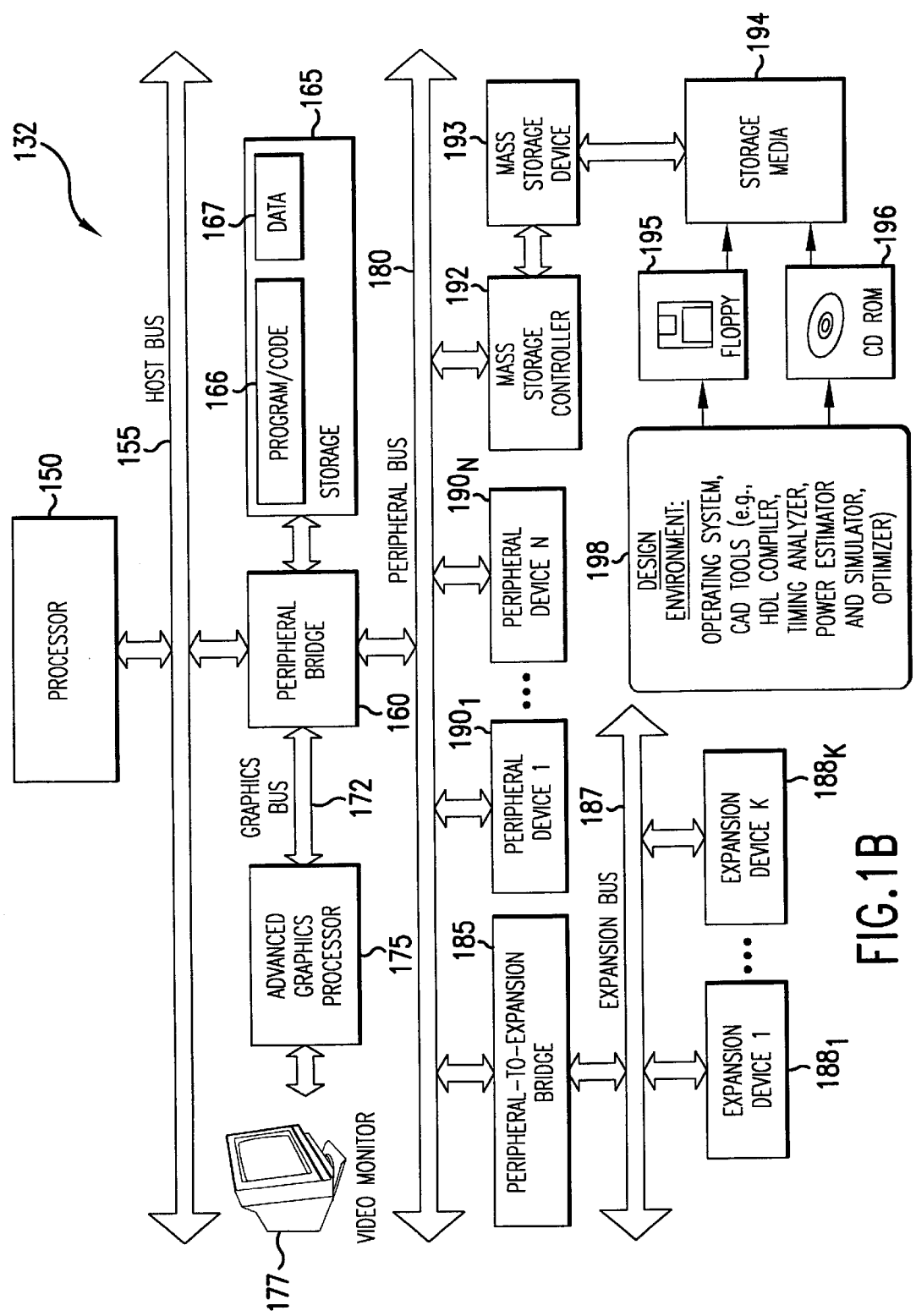
FIG. 1B is a diagram illustrating a computer system in which one embodiment of the present invention may be utilized.

FIG. 1B is a diagram illustrating one embodiment of a computer system 132 in which one embodiment of the present invention may be utilized. The computer system 132 comprises a processor 150, a host bus 155, a peripheral bridge 160, a storage device 165, an advanced graphics processor 175, a video monitor 177, and a peripheral bus 180.

The processor 150 represents a central processing unit of any type of architecture, such as complex instruction set computers ("CISC"), reduced instruction set computers ("RISC"), very long instruction word ("VLIW"), or hybrid architecture. The processor 150 is coupled to the peripheral bridge 160 via the host bus 155. While this embodiment is described in relation to a single processor computer system, another embodiment of the present invention, can be implemented in a multi-processor computer system.

The peripheral bridge 160 provides an interface between the host bus 155 and a peripheral bus 180. In one embodiment, the peripheral bus 180 is the Peripheral Components Interconnect ("PCI") bus. The peripheral bridge 160 also provides the graphic port, for example, Accelerated Graphics Port ("AGP"), or the graphics bus 172 for connecting to a graphics controller or advanced graphics processor 175. The advanced graphics processor 175 is coupled to a video monitor 177. The video monitor 177 displays graphics and images rendered or processed by the graphics processor 175. The peripheral bridge 160 also provides an interface to the storage device 165.

The storage device 165 represents one or more mechanisms for storing data. For example, the storage device 165 may include non-volatile or volatile memories. Examples of these memories include flash memory, read only memory ("ROM"), or random access memory ("RAM"). FIG. I B also illustrates that the storage device 165 has stored therein data 167 and program/code 166. The data 167 stores graphics data and temporary data. Program code 166 represents the necessary code for performing any and/or all of the techniques in the present invention. Of course, the storage device 165 preferably contains additional software (not shown), which is not necessary to understanding the invention.

The peripheral bus 180 represents a bus that allows the processor 150 to communicate with a number of peripheral devices. The peripheral bus 180 provides an interface to a peripheral-to-expansion bridge 185, peripheral devices $190_1$ to $190_N$, a mass storage controller 192, a mass storage device 193, and mass storage media 194. The peripheral devices $190_1$ to $190_N$ represent any device that is interfaced to the peripheral bus 180. Examples of peripheral devices are fax/modem controller, audio card, network controller, etc. The mass storage controller 192 provides control functions to the mass storage device 193. The mass storage device 193 is any device that stores information in a non-volatile manner. Examples of the mass storage device 193 includes hard disk, floppy disk, and compact disk ("CD") drive. The mass storage device 193 receives the mass storage media 194 and reads their contents to configure the design environment for the design engineer.

The mass storage media 194 contain programs or software packages used in the design environment. The mass storage media 194 represent a computer program product having program code or code segments that are readable by the processor 150. A program code or a code segment includes a program, a routine, a function, a subroutine, or a software module that is written in any computer language (for example, high level language, assembly language, machine language) that can be read, processed, compiled, assembled, edited, downloaded, transferred, or executed by the processor 150. The mass storage media 194 include any convenient media such as floppy diskettes, compact disk read only memory ("CD-ROM"), digital audio tape ("DAT"), optical laser disc, or communication media (e.g., Internet, radio frequency link, fiber optics link). For illustrative purposes, FIG. 1B shows floppy diskette(s) 195 and CD-ROM 196. The floppy diskettes 195 and/or CD-ROM 196 contain design environment 198. Examples of the tools or computer readable program code in the design environment 198 include operating system, computer aided design ("CAD") tools such as schematic capture, hardware description language ("HDL") compiler, text editors, net list generator, timing analyzer, power vector generator, timing simulator, power simulator, circuit configuration, component sizer, parameter function generator, parameter optimizer, and graphics design environment. Some or all of these tools, together with the operating system of the computer system 132 form the design environment 198 on which the design and optimization process can be carried out.

The peripheral-to-expansion bridge 185 represents an interface device between the peripheral bus 180 and an expansion bus 187. The expansion bus 187 represents a bus that interfaces to a number of expansion devices $188_1$ to $188_K$. An example of expansion device includes a parallel input/output ("I/O") device, a serial communication interface device. In one embodiment, the expansion bus 187 is an Industry Standard Architecture ("ISA") or Extended Industry Standard Architecture ("EISA") bus.

The computer system 132 can be used in all or part of the phases of the design process. The processor 150 executes instructions in the program 166 to access data 167 and interact with the design environment 198. In particular, the computer system 132 is used in the design optimization phase 130.

Figure 2:
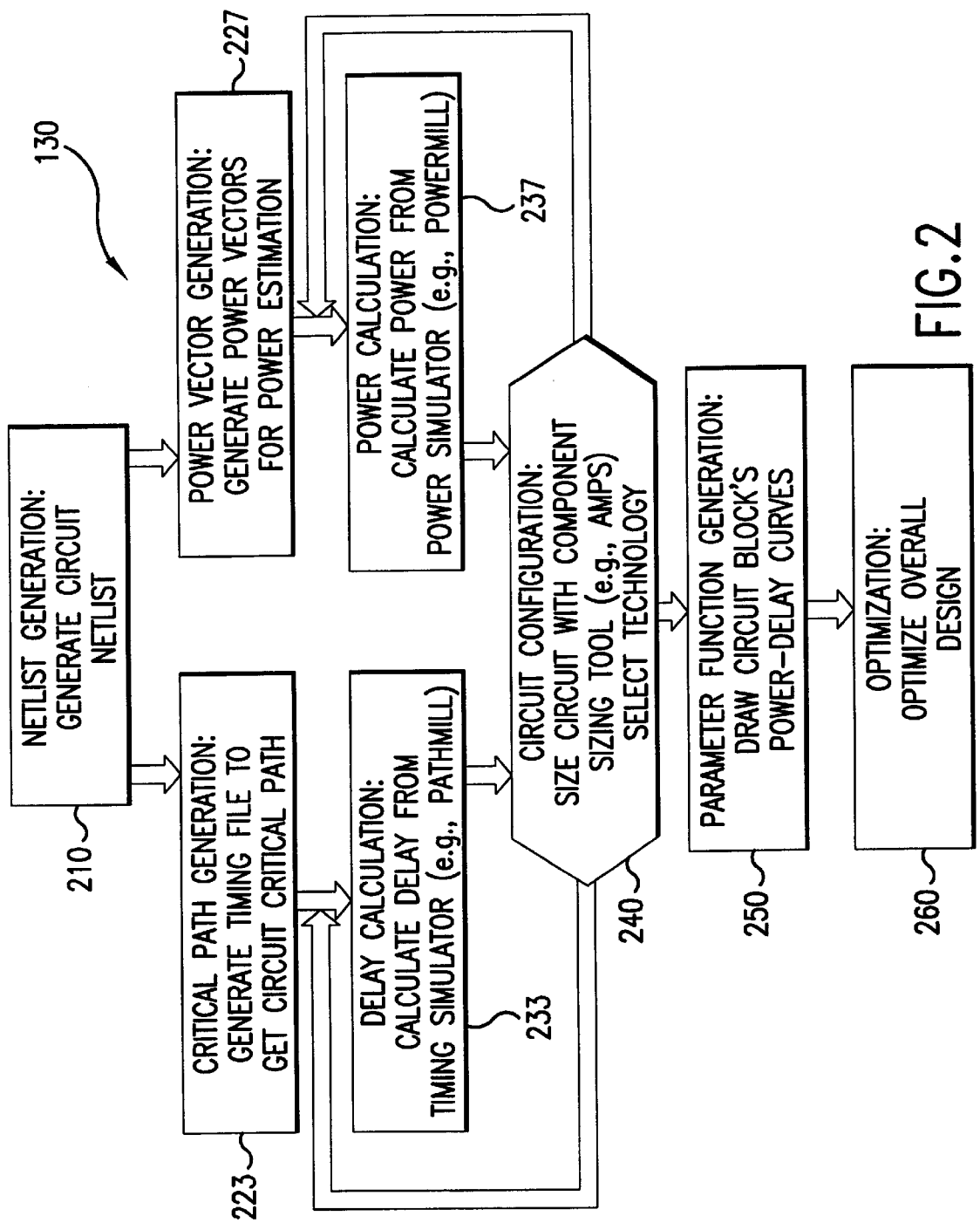
FIG. 2 is a diagram illustrating a design optimization phase according to one embodiment of the invention.

FIG. 2 is a diagram illustrating a design optimization phase according to one embodiment of the invention. The design optimization phase 130 includes a netlist generation module 210, a critical path generation module 223, a power vector generation module 227, a delay calculation module 233, a power calculation module 237, a circuit configuration module 240, a parameter function generation module 250, and an optimization module 260. Each of these modules may be a software module or a hardware module or a combination of both. In one embodiment, these modules are implemented by program code that are readable and executed by the processor 150.

The netlist generation module 210 generates the circuit netlist which provides the information on component identification and how the components of the circuit are interconnected. The circuit netlist becomes the input to the critical path generation module 223 and the power vector generation module 227. The critical path generation module 223 generates timing delays of various paths in the circuit based on circuit components and interconnection patterns. From these timing delays, the critical path(s) is (are) identified. The critical path represents the path through which the overall propagation delay is the critical, e.g., timing parameters (e.g., setup time, hold time) are difficult to satisfy. The timing files generated by the critical path generation module 223 become the input to the delay calculation module 233. The delay calculation module 233 calculates the delays of the critical paths and other paths using a timing simulator. In one embodiment, the timing simulator is the PathMill tool, developed by Epic Technologies, now owned by Synopsys, of Mountain View, Calif. The delay values are then forwarded to the circuit configuration module 240. On the power side, the power vector generation module 227 generates power vectors as input to the power calculation module 237. The power calculation module 237 calculates the power consumption of the circuit using a power estimator tool. In one embodiment, the power estimator tool is the Power Mill tool, developed by Epic Technologies of Mountain View, Calif. The power values are then forwarded to the circuit configuration module 240.

The circuit configuration module 240 configures the circuit to effectuate the power consumption and delay. One configuration is scaling the sizes (e.g., transistor size) of the circuit components using a sizing tool. In one embodiment, the sizing tool is Amps developed by Epic Technologies of Mountain View, Calif. The sizing tool applies scale factors to scale down the circuit elements either globally or locally. The resulting circuit is then simulated again for the next delay and power values. The circuit configuration module 240 generates new circuit information to be fed back to the delay calculation module 233 and the power calculation module 237. The process continues until all the values within the range of the scaling have been used. Then the delay and power values are forwarded to the parameter function generation module 250. The parameter function generation module 250 generates the parameter function (e.g., power-delay curves) showing the relationship between the design parameters. The parameter function generation module 250 may also generate the design parameters in any other convenient forms for later processing.

The optimization module 260 receives the values of the design parameters either in the form of a parameter curve, or in any other convenient format. The optimization module 260 determines the optimal values of the design parameters.

Figure 3:
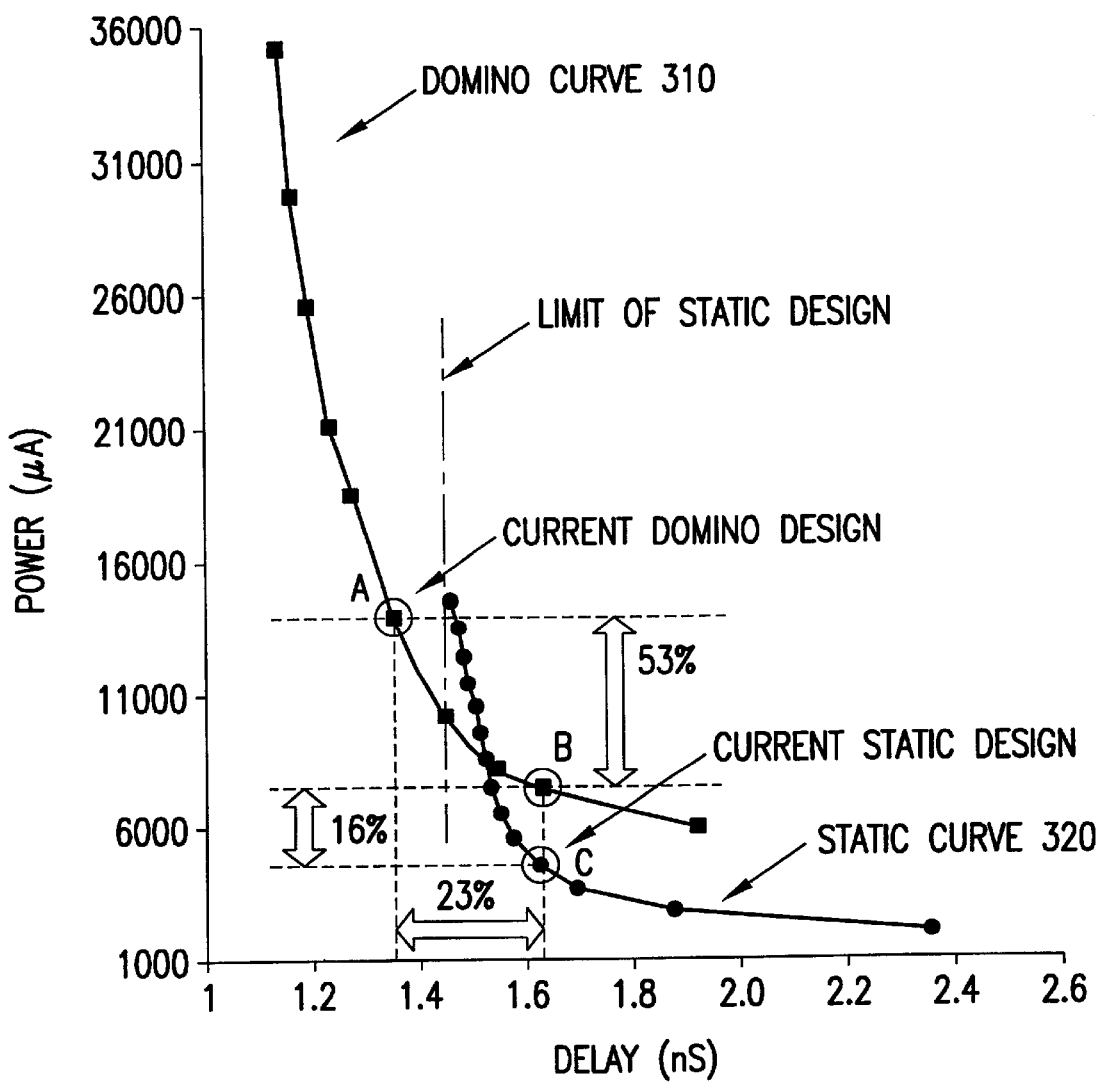
FIG. 3 is a diagram illustrating power-delay curves according to one embodiment of the invention.

FIG. 3 is a diagram illustrating a power-delay curve according to one embodiment of the invention. The power-delay curves show two curves: a domino curve 310 and a static curve 320.

The power-delay curves in FIG. 3 show the parameter function for an arithmetic circuit. The arithmetic circuit can be designed using a domino circuit technology or a static circuit technology. The domino curve 310 is the power-delay curve for the circuit using the domino circuit technology and the static curve 320 is the power-delay curve for the circuit using the static circuit technology.

The domino curve 310 has two design points A and B. The design point A corresponds to the current domino design. At this design point, the circuit has a delay of approximately 1.35 nsec and a power consumption of approximately 14 mA. The design point B corresponds to another domino design with longer delay at approximately 1.62 nsec and a power consumption of approximately 6.1 mA. Therefore the saving in power to go from design point A to design point B is 53% for a delay penalty of 23%.

The static curve 320 has a design point C. The static curve 320 has a delay limit at approximately 1.42 nsec. The design point C is at a delay of approximately 1.62 nsec and a power consumption of approximately 4.5 mA. Therefore, the design point C has approximately the same delay as the design point B of the domino curve 310 but has an additional power saving of 16%.

The parameter curve therefore provides the design engineer an immediate visualization of the relationship between the design parameters, e.g., power, delay illustrated in FIG. 3, so that optimization can be carried out.

In accordance with an embodiment of the present invention a mathematical approach to automatically solve for the optimal delay allocation of datapath blocks during the circuit design phase of a chip design is presented. For example, in FIG. 4, a macro graph of datapath macros representing a circuit design for use according to one embodiment of the invention is illustrated.

Figure 4:
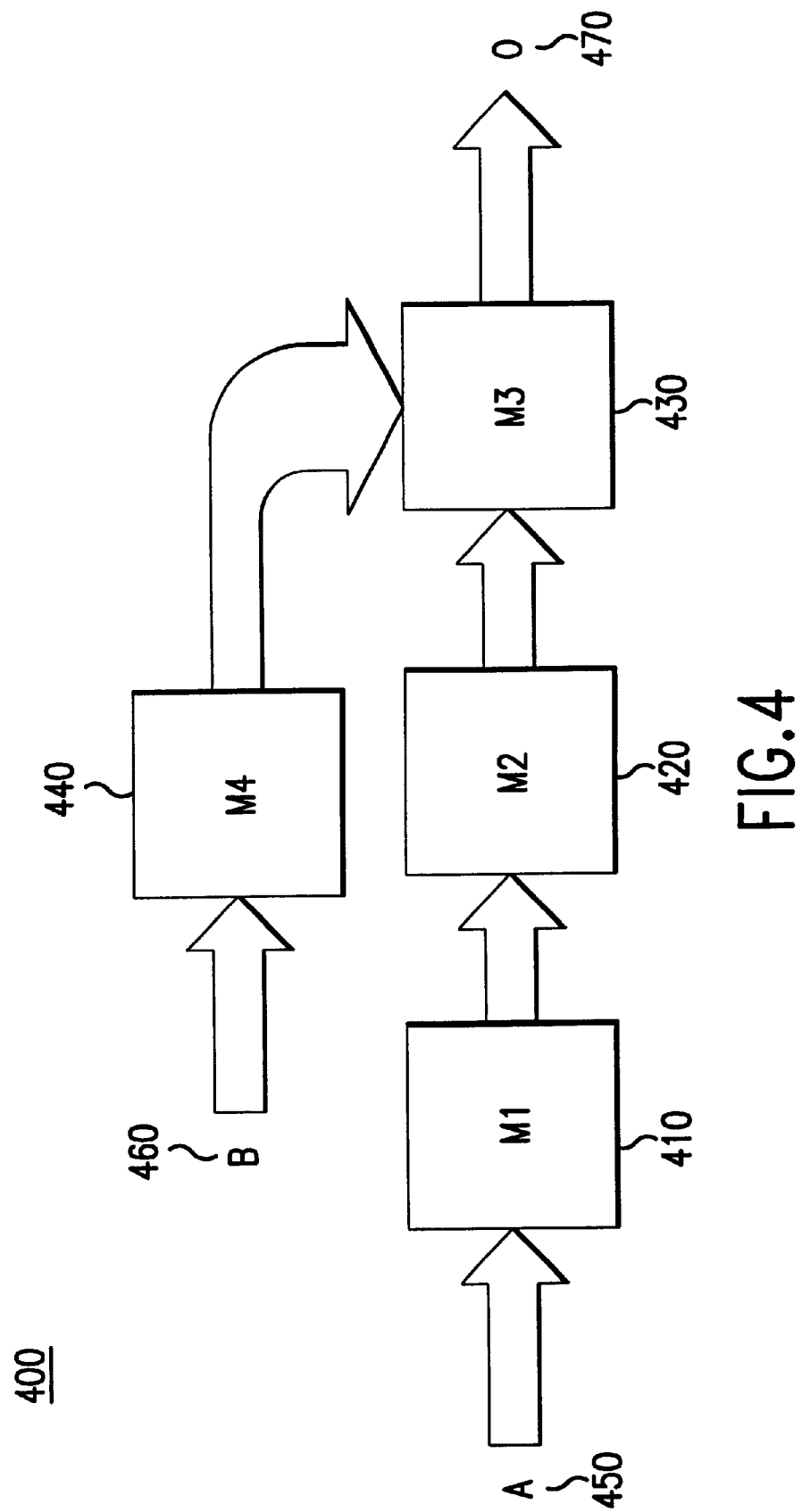
FIG. 4 is a diagram illustrating a macrograph of datapath macros representing a circuit design for use according to one embodiment of the invention.

In FIG. 4, M1 410, M2 420, M3 430, and M4 440 are datapath macros for which area-delay trade-off curves, such as those shown in FIG. 2, for their different implementations are available. Therefore, when a designer wishes to meet a specified delay target from data A 450 to output O 470 and from data B 460 to output O 470, the designer needs to answer the following questions:

1. What is the best implementation for each of the macros that minimizes the area (measured as total transistor width) or power (measured as the sum of the powers dissipated by the macros in the design)? and 2. What is the optimal delay assignment to each of these macros so as to obtain a minimum area or power solution?

In the following description of this embodiment of the present invention a solution to determine the optimized area is presented. However, determining the optimal power solution is performed using the similar method used to optimize for area. The only difference is that in order to optimize for power, the power-delay curves are used instead of the area-delay curves for each macro block. Also, the objective function when optimizing for power is the sum of the powers dissipated by the macros.

Figure 5:
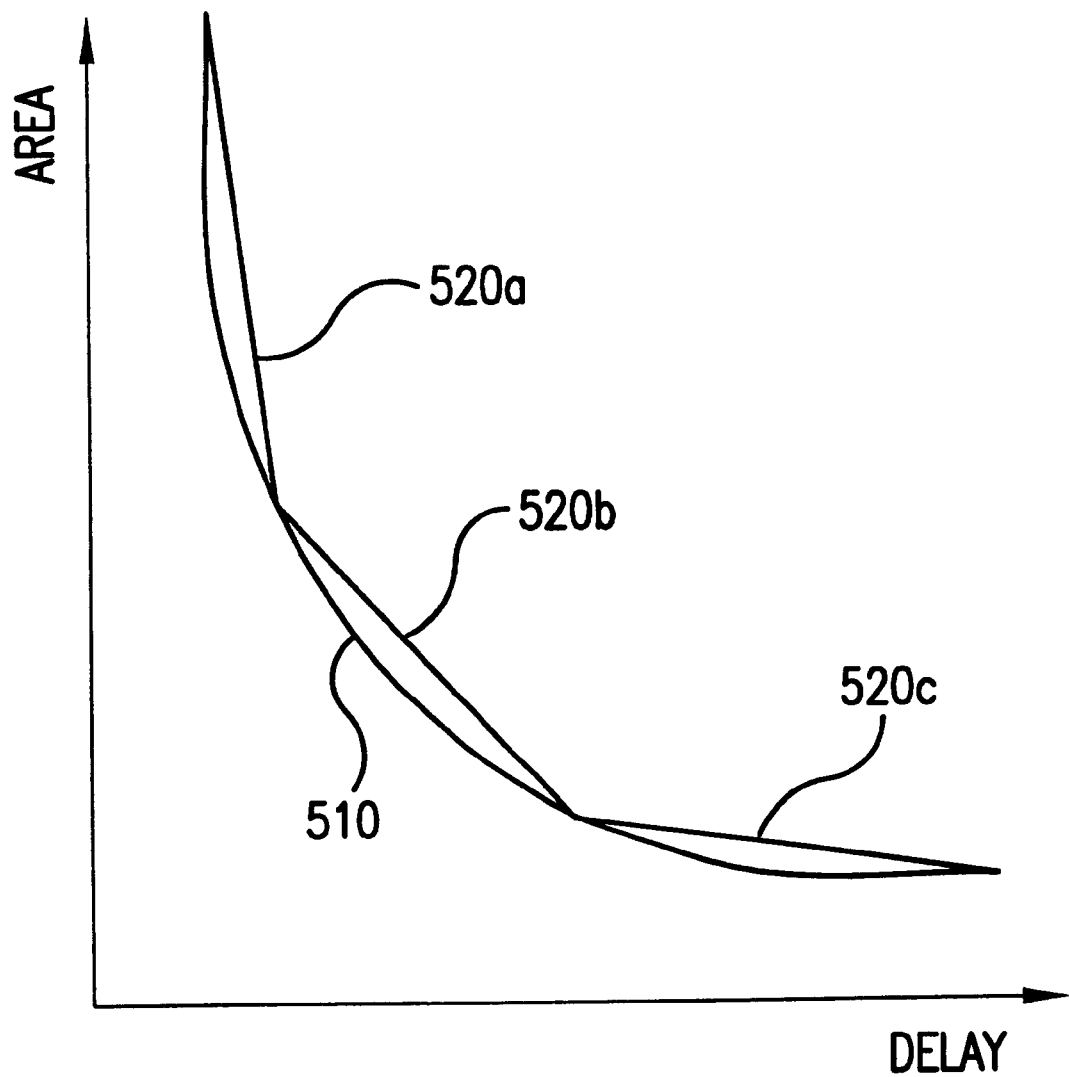
FIG. 5 is a diagram illustrating a piece-wise approximation of an area-delay trade-off curve for use according to one embodiment of the invention.

An embodiment of the present invention assumes that there are m macros in the macro graph to be optimized. For example, in FIG. 4, there are 4 macros in the macro graph. Also, in this embodiment specific implementations for each of the macros are assumed. Given this information, the delay assignment for each of these implementations can be calculated so as to meet the delay constraints. As stated earlier, in this embodiment of the present invention, the area-delay trade-off curve for each implementation of all the macros is known a-priori. These can be generated very efficiently using external CAD vendor tools like AMPS or more advanced design tools that employ the methods shown in FIG. 2. Given an area-delay trade-off curve for each macro, this embodiment of the present invention, begins by forming a piecewise linear approximation of each of the area-delay trade-off curves. These piecewise approximations can be made arbitrarily accurate more by increasing the number of linear pieces. While an exemplary piecewise linear approximation of an area-delay curve 510 is shown in FIG. 5 with three separate piecewise approximation sections 520*a*, 520*b*, and 520*c*, respectively, the number of approximation sections can easily be increased to four or more for more accurate approximations. Similarly, the number of approximation sections can be decreased to two or one with an attendant decrease in the accuracy of the approximation.

Therefore, in this embodiment of the present invention, the piecewise linear approximation of an implementation of a given macro 'i' can be expressed as follows:

$$a_{i,11}A_i + a_{i,21}D_i \geq 1$$
$$a_{i,12}A_i + a_{i,22}D_i \geq 1$$
$$\ldots$$
$$a_{i,1r}A_i + a_{i,2r}D_i \geq 1$$

Here, $A_i$ and $D_i$ are the area and delay variables, respectively, associated with the implementation of macro 'i' and each piecewise linear approximation is normalized. As the area-delay curve represents a Pareto-optimal curve, it follows that the piece-wise linear approximation of the area-delay curve generates a convex set of all feasible realizations of the implementation. In another embodiment of the present invention, which is optimizing for power, the above equations still apply and the area variable, $A_i$, is replaced by a power variable, $C_i$.

Let the different paths ($p_j$) through the macro graph be contained in the set P. For example the set P for macro graph in FIG. 4 contains two paths, the first one from data 'A' 450 to output 'O' 470 and, the second from data 'B' 460 to output 'O' 470. Assume that the set P contains N paths. Then, for each $p_j \in P$, the delay constraint on it can be written as, $$\Sigma b_{ij}D_i \leq 1, \text{ where } b_{ij}=0 \text{ if Macro 'i' is absent on path } p_j; 1 \leq i \leq m; 1 \leq j \leq N.$$

Again, m is equal to the number of macros and N is equal to the number of paths. To minimize the overall area of the design, where the area is given by $\Sigma A_i$ ($1 \leq i \leq m$), in this embodiment of the present invention, combining the above inequalities, results in the following optimization problem (OPT1):
Objective: min $\Sigma A_i$ ($1 \leq i \leq m$)
Constraints:

$$\Sigma b_{ij}D_i \leq 1, \text{ where } b_{ij}=0 \text{ if Macro 'i' is absent on path } p_j; 1 \leq i \leq m; 1 \leq j \leq N.$$

For each Macro $1 \leq i \leq m$, $$a_{i,11}A_i + a_{i,21}D_i \geq 1$$
$$a_{i,12}A_i + a_{i,22}D_i \geq 1$$
$$\ldots$$
$$a_{i,1r}A_i + a_{i,2r}D_i \geq 1$$
$$D_{i,min} \leq D_i \leq D_{i,max}, 1 \leq i \leq m$$
$$A_i \geq 0, 1 \leq i \leq m$$

Here, $D_{i,min}$ and $D_{i,max}$ are the minimum and maximum possible delays associated with the implementation of macro 'i'.

Note that since OPT1 is a linear programming problem, it can be solved efficiently using tools like COPL_LP (A linear programming solver from the University of Iowa), or commercial tools like MATLAB. MATLAB is developed by the Mathworks, Incorporated of Natick, Mass. It is important to note that if the problem is infeasible, it implies that the implementations chosen for the macros can not meet the delay constraints. However, if the problem is feasible, then the optimal delays to be allocated to various macros in the graph that would lead to a minimum area solution will result.

In this embodiment of the present invention, a check for the feasibility of the optimization problem is performed by determining if the minimum-delay values of the implementations satisfy the generated delay constraints. For example, in FIG. 4, the minimum delays of the implementations of macros 1 through 4 are checked to determine if they satisfy the delay constraints on the paths from data 'A' 450 to output 'O' 470 and from data 'B' 460 to output 'O' 470. If the implementations of macros 1 through 4 are not feasible, then the current implementations chosen for the macros can not meet the designer specified delay constraints. If the implementations of macros 1 through 4 are feasible, then the optimization problem OPT1 can be solved.

The above embodiment of the present invention solves the problem of finding the optimal delay assignment to the macros when an implementation has already been chosen for the macros by the designer. However, this will not always produce the most optimal, solution. Therefore, in another embodiment, the present invention determines the most optimal implementation for the macros under designer specified delay constraints.

To solve this more general problem, since the system does not have a-priori knowledge of the implementation of each block, the system assumes that each macro in the graph, $M_i$, has $L_i$ possible implementations. One approach to solving the problem of finding out the best implementation for each macro, which is referred to as "binding" in high-level synthesis, is to solve OPT1 for each of the candidate binding solutions. The number of problems of type OPT1 that need to be solved to get the best possible implementation of the design is given by $\Pi \Lambda_i$ ($1 \leq i \leq m$). This can quickly become a large number if the number of possible implementations is large.

An embodiment of the present invention provides an approach to simultaneously search for the most optimal solution among all the possible binding solutions. This is achieved as follows. Let $A_{ik}$ and $D_{ik}$ be the area and delay associated with implementation 'k' of macro 'i'. Also define a new variable called A to measure the optimal area of the solution. Then it follows that:

$$A \leq \Sigma A_{ik}; 1 \leq k \leq \Lambda_i; 1 \leq i \leq m;$$

Any candidate binding solution must satisfy the delay constraints. This implies that $$\Sigma b_{ij,k}D_{ik} \leq 1, \text{ where } b_{ij,k}=0 \text{ if Macro 'i' is absent on path } p_j$$

$$1 \leq k \leq \Lambda_i; 1 \leq i \leq m; 1 \leq j \leq N.$$

The optimization problem (OPT2) can now be stated as follows:
Objective: max A
Constraints:

$$A \leq \Sigma A_{ik}; 1 \leq k \leq \Lambda_i; 1 \leq i \leq m;$$

$$\Sigma b_{ij,k}D_{ik} \leq 1, \text{ where } b_{ij,k}=0 \text{ if Macro 'i' is absent on path } p_j$$

$$1 \leq k \leq \Lambda_i; 1 \leq i \leq m; 1 \leq j \leq N.$$

For each Macro $1 \leq i \leq m$, and each implementation $1 \leq k \leq \Lambda_i$ $$a_{i,11}A_i + a_{i,21}D_i \geq 1$$
$$a_{i,12}A_i + a_{i,22}D_i \geq 1$$

...

$$a_{ik,1n}A_i + a_{ik,2n}D_{ik} \geq 1$$

$$D_{ik,min} \leq D_{ik} \leq D_{ik,max}, \ 1 \leq i \leq m$$

$$A_{ik} \geq 0, \ 1 \leq i \leq m; \ A \geq 0.$$

Here, $D_{ik,min}$ and $D_{ik,max}$ are the minimum and maximum possible delays associated with implementation 'k' of macro 'i'.

Note that if all the possible implementations of every macro leads to a feasible final solution, OPT2 is feasible. Then, the optimal solution to OPT2 is the optimal solution to the binding problem. However, if OPT2 is infeasible, it implies that there exists a binding that can not meet the delay constraints. Therefore, this embodiment of the present invention eliminates such bindings while formulating the optimization problem rather than discovering unfeasibility after forming the constraints. This can potentially save on the run-time. As described above, checking for unfeasibility is quite simple, given a binding. At the time of forming the linear program, we simply perform the test for feasibility described above for OPT1. If the problem is infeasible, then, the current binding is dropped and the system moves on to the next binding. If the problem is feasible, then the system adds the constraints of the current binding to the linear program and moves on to the next binding. This process is repeated until all of the potential bindings have been checked. As a result, this approach guarantees that the optimization problem OPT2 is feasible and that the optimal solution of OPT2 gives us the optimal binding.

Figure 6:
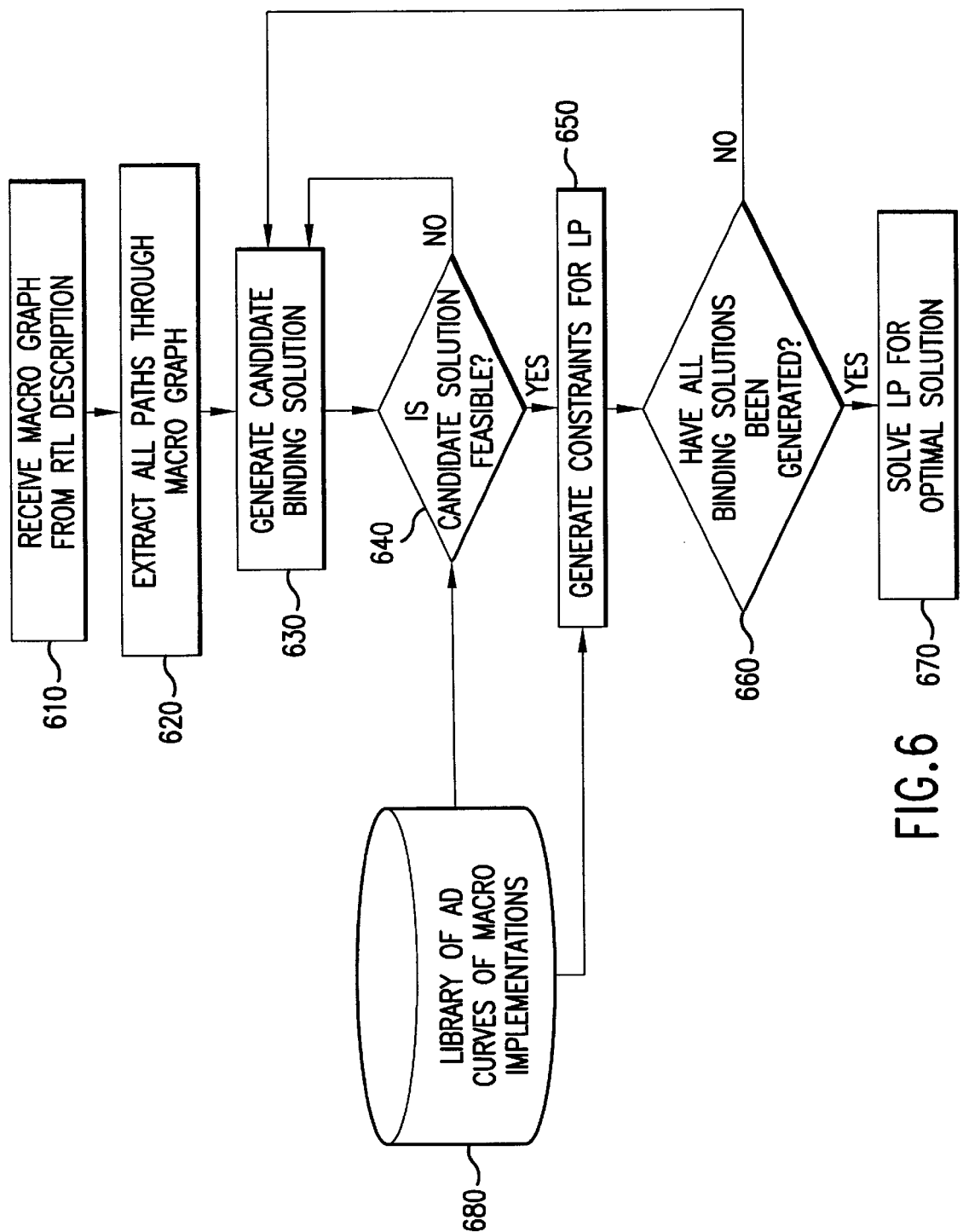
FIG. 6 is a flow diagram illustrating a method for performing an area-delay curve based determination of optimal design parameter values according to one embodiment of the invention.

The flow diagram for solving the optimal binding problem is shown in FIG. 6. A pre-requisite for this optimization is a database of area-delay curves for the macros under consideration and their corresponding implementations 680. The system takes as input a macro graph, which has been previously generated from the RTL description of the design. From this macro graph, the system automatically generates all of the possible paths in the graph. The designer specifies the delay constraints on the paths. Based on the implementations for the macros, in the database, the system generates candidate binding solutions. For each binding solution, the system checks for unfeasibility. If the solution is infeasible, the system moves on to the next candidate binding. Otherwise, the system generates the constraints for the linear program. This procedure is repeated until all binding solutions have been exhausted. Finally, the system solves the linear program to produce the optimal solution, which corresponds to the optimal binding along with the optimal delay allocation.

In FIG. 6, in block 610, the RTL description of a circuit Functional Unit Block ("FUB ") is translated into a graph describing the connectivity of the macros (adders, multiplexers, etc.) in the FUB and transmitted to block 620. Block 610 can either be done automatically using an internally developed CAD tool or manually by the designer. The graph provides information regarding how data and control flow through the FUB. This graph also forms the basis for extracting the various paths through which information can flow in the design. In block 620, the system automatically extracts the various paths through which information can move in the design to ensure that the timing constraints, which determine design performance, are met on all of these paths for a successful design. To currently generate these paths would require a designer to perform exhaustive and time consuming manual searches on the graph. Since, each macro in the design can be potentially implemented in several ways, an association of implementations with macros is referred to as a candidate binding solution. In block 630, a candidate solution is generated by choosing an implementation for each macro block in the FUB and then applying the subsequent steps in the flow. Each candidate solution is then transmitted to block 640 to determine if that implementation meets the timing constraints on the extracted paths found in block 620. In block 640, the area-delay curves for all of the possible implementations of the macros are read from the database 680 and used to determine the candidate solution is feasible. If, in block 640, the candidate solution is found to be infeasible, then the candidate solution is discarded and the system returns to block 630 to generate another candidate solution. If, in block 640, the candidate solution is found to be feasible then, in block 650, the system generates constraints for the candidate solution using the area-delay curves associated with the chosen implementations in database 680 for the linear program. These constraints are shown in OPT2. The area-delay curves in the library of database 680 can be generated by using either a commercial CAD tool or internally developed Intel CAD tools. Then, in block 660, a check is made to determine if all of the possible binding solutions have been generated, and if they have not all been generated, then the system returns to block 630 to continue generating candidate binding solutions. If, in block 660, it is determined that all of the possible binding solutions have been generated, then, a complete linear program (LP) which captures all the feasible binding solutions associated with the graph, along with the area-delay curves for the chosen macro implementations and the timing constraints on the design exists. Then, in block 670, the system solves the LP for the optimal solution using either a commercial or an internally developed LP solver. The solution to this LP gives the optimal implementations for the macros in the macro graphs along with their respective delays that meet the designer specified timing constraints and has the lowest area requirements.

In an alternate embodiment of the present invention, the system is configured and used to optimize power for the macro graph of FIG. 4, as described above for the area optimization.

Figure 7:
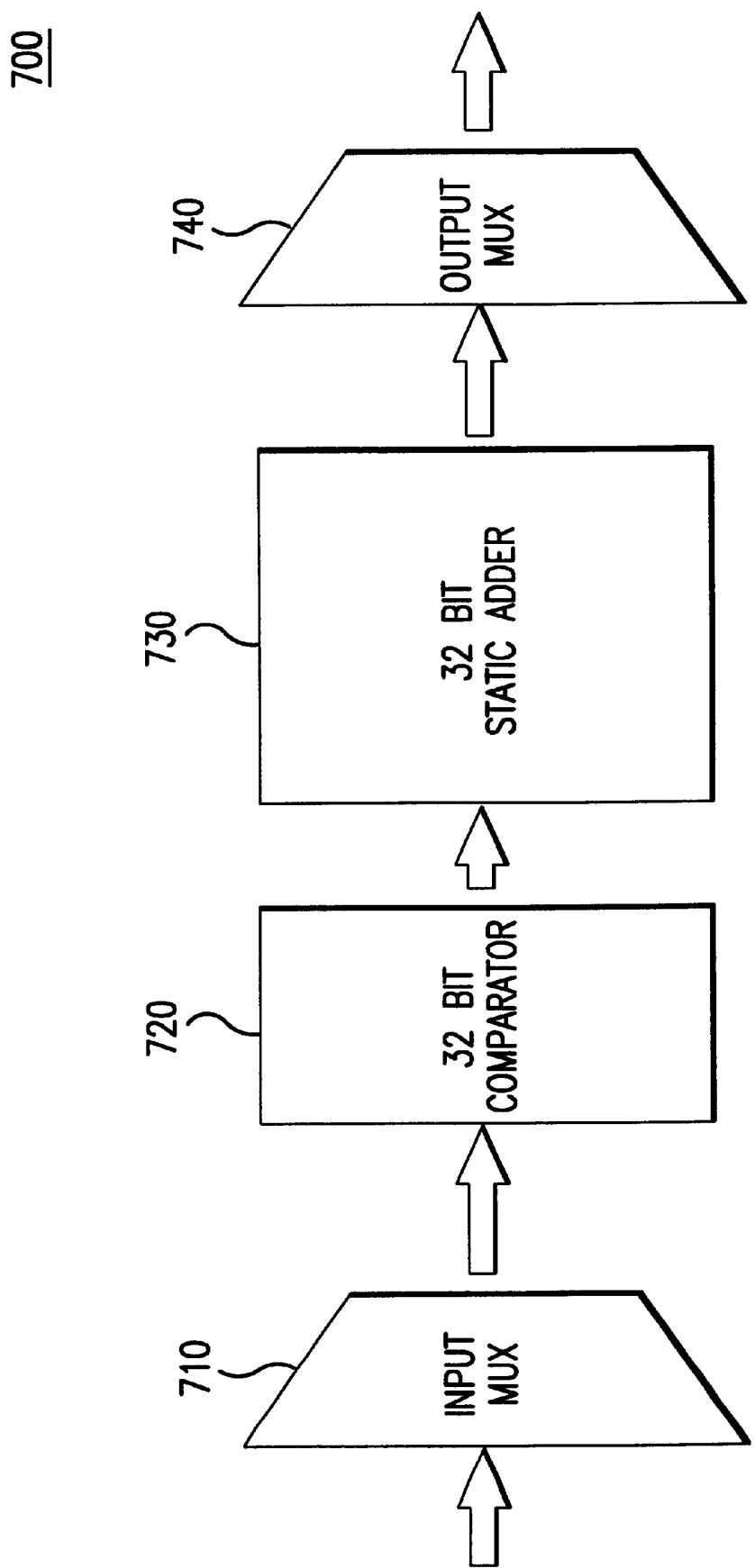
FIG. 7 is a diagram illustrating an example of an arithmetic logic unit datapath functional block according to one embodiment of the invention.

FIG. 7 is a diagram illustrating an example of an arithmetic logic unit ("ALU") datapath subsystem or FUB according to one embodiment of the invention. The ALU datapath FUB 700 includes an input multiplexer ("MUX") 710, a comparator 720, a static adder 730, and an output MUX 740. The ALU datapath FUB 700 is a common design used in the processor 150 or the graphic processor 175 in FIG. 1B.

In this illustrative example, the design parameters include power and delay and the parameter function is the power-delay curve. The constraint parameter is the propagation delay through the ALU FUB 700 and the optimizing parameter is the power. The optimization is to minimize the overall power consumption while keeping the propagation delay within the specified design constraint.

The input MUX 710, the comparator 720, the static adder 730 and the output MUX 740 form a cascaded chain of circuit elements which has a critical path going from one end to the other end. The composite delay is the sum of the individual delays through each of the circuit elements. In addition, it is assumed that these circuit elements are active, e.g., the power consumption of the ALUFUB 700 is the sum of the individual power consumption.

In an actual test case used in one embodiment of the present invention, the delay requirement from input to output was specified as 4350 picoseconds ("ps"). The power-delay curves were linearized, that is, "approximated," similar to FIG. 5, with 6 linear pieces for the input MUX 710, comparator 720 and output MUX 730, and 5 linear pieces for the adder 740. All of the generated constraints were fed to a linear program solver, in this case COPL_LP. For the given delay constraint the final solution generated by the solver was 19.2% smaller in power than a manually determined solution by a designer. In fact, the solution generated using the embodiment of the present invention was also 9.8% smaller than the solution generated by hand optimization of the power-delay curves.

Figure 8B:
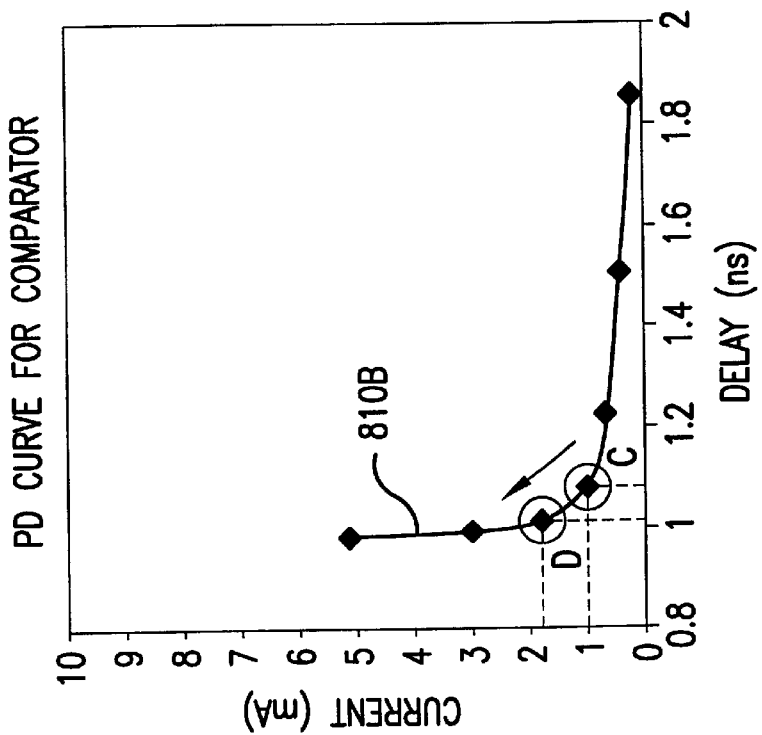
FIG. 8B is a diagram illustrating a power-delay curve for the comparator shown in FIG. 8 according to one embodiment of the invention.
Figure 8A:
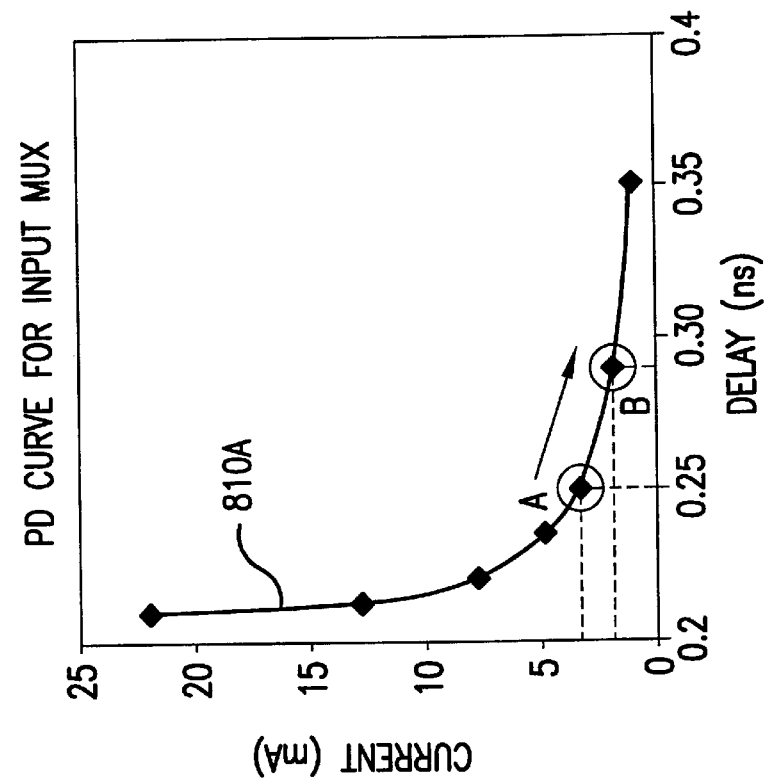
FIG. 8A is a diagram illustrating a power-delay curve for the input multiplexer shown in FIG. 8 according to one embodiment of the invention.

FIG. 8A is a diagram illustrating an exemplary power-delay curve 810A for the input multiplexer shown in FIG. 7 according to one embodiment of the invention. The power-delay curve 810A has two design points, A and B. The design point A has a delay value of 0.25 nsec and a power value of 3.2 mA. The design point B has a delay value of 0.29 nsec and a power value of 1.79 mA. A and B are the initial and new design points, respectively. The arrow shows the move from design point A to design point B during the design optimization phase 130.

FIG. 8B is a diagram illustrating illustrating an exemplary power-delay curve 810B for the comparator shown in FIG. 7 according to one embodiment of the invention. The power-delay curve 810B has two design points, C and D. The design point C has a delay value of 1.12 nsec and a power value of 1.0 mA. The design point D has a delay value of 1.06 nsec and a power value of 1.04 mA. C and D are the initial and new design points, respectively. The arrow shows the move from design point C to design point D during the design optimization phase 130.

Figure 8D:
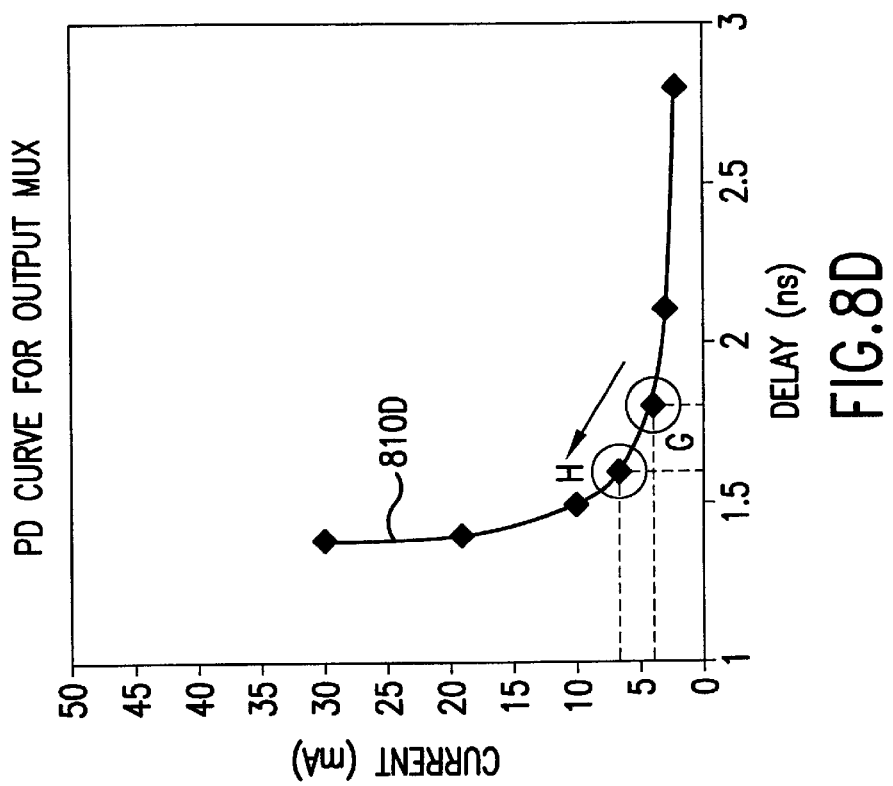
FIG. 8D is a diagram illustrating a power-delay curve for the output multiplexer shown in FIG. 8 according to one embodiment of the invention.
Figure 8C:
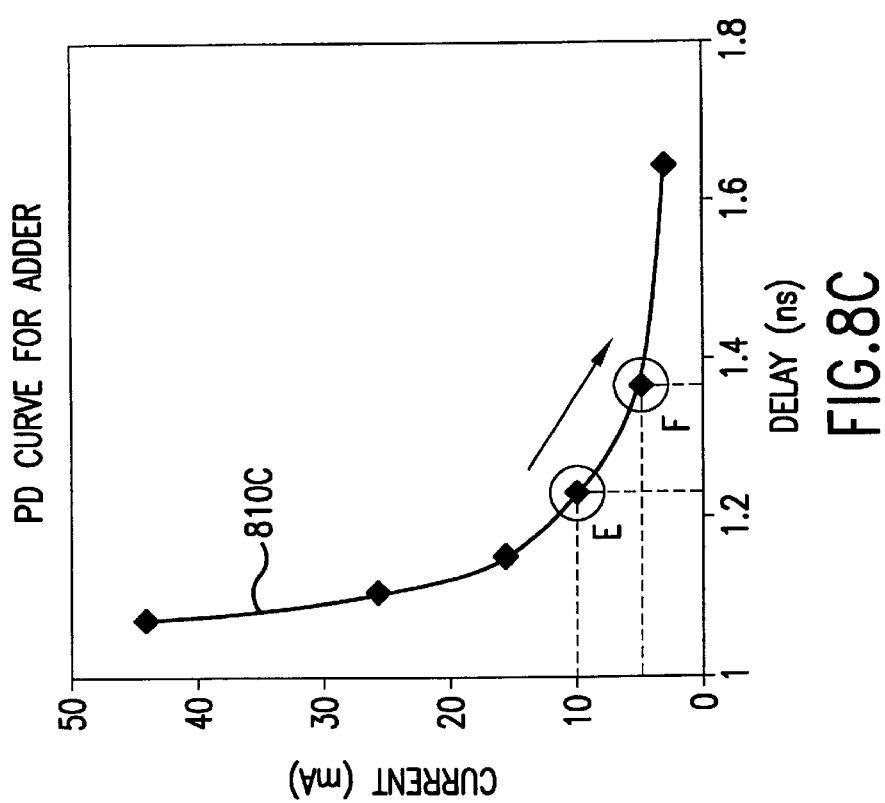
FIG. 8C is a diagram illustrating a power-delay curve for the static adder shown in FIG. 8 according to one embodiment of the invention.

FIG. 8C is a diagram illustrating an exemplary power-delay curve 810C for the static adder shown in FIG. 7 according to one embodiment of the invention. The power-delay curve 810C has two design points, E and F. The design point E has a delay value of 1.23 nsec and a power value of 10.0 mA. The design point F has a delay value of 1.36 nsec and a power value of 5.92 mA. E and F are the initial and new design points, respectively. The arrow shows the move from design point E to design point F during the design optimization phase 130.

FIG. 8D is a diagram illustrating an exemlary a power-delay curve 810D for the output multiplexer shown in FIG. 7 according to one embodiment of the invention. The power-delay curve 810D has two design points, G and H. The design point G has a delay value of 1.75 nsec and a power value of 4.0 mA. The design point H has a delay value of 1.64 nsec and a power value of 5.93 mA. G and H are the initial and new design points, respectively. The arrow shows the move from design point G to design point H during the design optimization phase 130.

The power and delay parameters obtained from the power-delay curves 810A, 810B, 810C, and 810D have the following values:

| Initial design points: | |
|---|---|
| Total delay: | 0.25 + 1.12 + 1.23 + 1.75 = 4.35 nsec |
| Total current: | 3.2 + 1.0 + 10.0 + 4.0 = 18.2 mA |
| New design points: | |
| Total delay: | 0.29 + 1.06 + 1.36 + 1.64 = 4.35 nsec |
| Total current: | 1.79 + 1.04 + 5.92 + 5.93 = 14.7 mA |

Therefore, for the above example, it is seen that the new design points B, D, F, H result in the same composite delay of 4.35 nsec, but with a 19.2% saving in power.

The power-delay curves in FIGS. 8A, 8B, 8C, and 8D illustrate the optimization process by varying the variable design parameter and selecting the best overall values. The variable design parameter is common to all the curves. In this example, the variable design parameter is the transistor size, or the power of the block.

The optimization process can be applied for different circuit configurations. For example, a circuit block can be designed using a static circuit technology or a domino circuit technology as illustrated in FIG. 3. In another example, a circuit block may be designed using a multiplexer or a decoder. In these cases, the optimization process can be carried out based on the parameter function, for example, power-delay curve.

Figure 9:
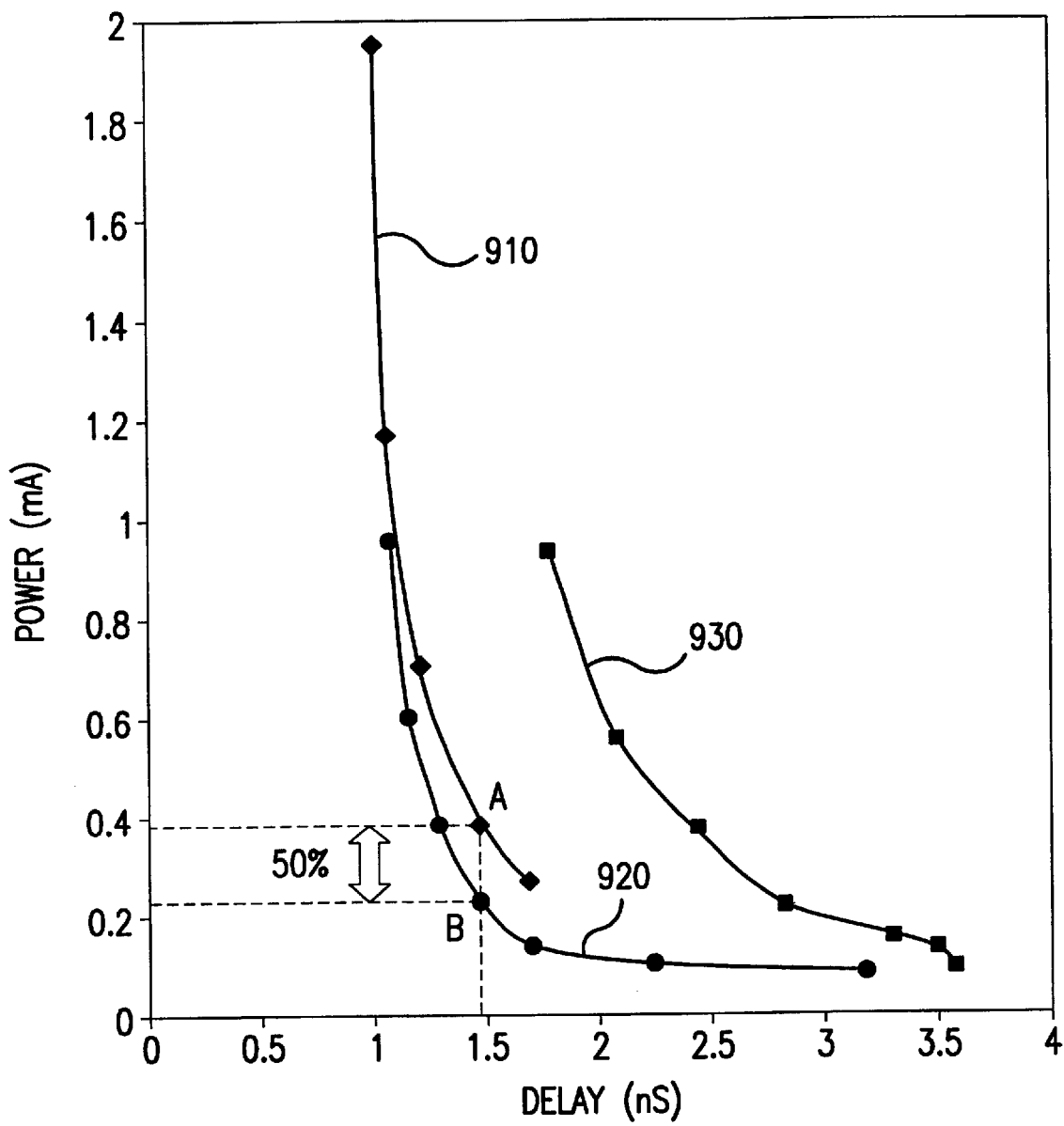
FIG. 9 is a diagram illustrating a comparison of the power-delay curves for the three different implementation of an example circuit according to one embodiment of the invention.

FIG. 9 is a diagram illustrating a comparison of the power-delay curves for three different implementations of an example circuit according to one embodiment of the invention. The power-delay curves 910, 920, and 930 correspond to the initial, better, and worse designs, respectively.

The power-delay curve 910 has high power consumption but fast speed. The power-delay curve 920 has a wider delay range and reasonable power consumption. The power-delay curve 930 is similar to 920 but the delay covers a slower range.

Suppose the design constraint is a delay of approximately 1.5 nsec. Under this timing constraint, it is seen that the design depicted by the power-delay curve 930 is not acceptable. Both designs depicted by the power-delay curves 910 and 920 are acceptable because they cover the specified timing constraint. However, the power-delay curve 920 shows abetter design because at 1.5 nsec, it results in a 50% power reduction.

Embodiments of the present invention therefore provide a technique to automatically determine the optimal design of a subsystem or functional block having a number of circuits. The subsystem or functional block has a set of design parameters which are divided into two groups: optimizing parameters and constraint parameters. The technique includes the generation of parameter functions or data files which show the relationship between the design parameters. An optimization process is then carried out to select the optimal values for the optimizing parameters while keeping the constraint parameters to be within the specified range. The technique provides the design engineer a global picture of the overall design so that global optimization can be performed.

The disclosed embodiments are illustrative of the various ways in which the present invention may be practiced. Other embodiments can be implemented by those skilled in the art without departing from the spirit and scope of the present invention. Accordingly, all such embodiments which fall within the spirit and the broad scope of the appended claims will be embraced by the principles of the present invention.

What is claimed is:

1. A method for automatically determining optimal design parameters of a subsystem to meet design constraints, the subsystem comprising a plurality of circuits, the method comprising:

performing a parameter-delay curve optimization of the subsystem design parameters to determine the optimal design parameters, wherein the parameter-delay curve is selected from the group comprising power-delay curves and area-delay curves;

wherein performing a parameter-delay curve optimization of the subsystem design parameters to determine the optimal design parameters comprises:

receiving a macro graph description of the subsystem;

extracting all possible paths through the macro graph;
generating all possible candidate binding solutions for the macro graph;
determining which of the possible candidate binding solutions are feasible;
generating constraints for each of the feasible candidate binding solutions; and
solving all constraints for each of the feasible candidate binding solution to determine the optimal solution; and
wherein said extracting all possible paths through the macro graph comprises:
determining each unique pathway from each input datapath block to each output datapath block in the macro graph; and
wherein said generating all possible candidate binding solutions for the macro graph comprises:
determining an implementation for each datapath block in a pathway; and
associating each of the datapath blocks into a candidate binding solution for the pathway; and
wherein said associating each of the datapath blocks into a candidate binding solution for the pathway comprises:
creating a piecewise linear approximation for each feasible candidate binding solution; and
wherein the piecewise linear approximation includes either of the following representative expressions:

$$a_{i,11}A_i + a_{i,21}D_i \geq 1$$

$$a_{i,12}A_i + a_{i,22}D_i \geq 1$$

$$\ldots$$

$$a_{i,1r}A_i + a_{i,2r}D_i \geq 1,$$

or $$a_{i,11}A_i + a_{i,21}P_i \geq 1$$

$$a_{i,12}A_i + a_{i,22}P_i \geq 1$$

$$\ldots$$

$$a_{i,1r}A_i + a_{i,2r}P_i \geq 1.$$

2. The method of claim 1, wherein said determining all feasible candidate binding solutions comprises:
obtaining a first parameter-delay curve for each of the datapath blocks in the candidate binding solution;
combining values from the first parameter-delay curves for the datapath blocks; and
comparing the combined values against a delay constraint value, wherein the candidate binding solution is feasible if the combined values are not greater than the delay constraint value.

3. The method of claim 2, wherein said delay constraint value comprises:
summing a datapath block delay constraint value for each datapath block in the pathway.

4. The method of claim 3, wherein said generating constraints for each of the feasible candidate binding solutions comprises:
creating constraints for each of the feasible candidate binding solutions using a specified delay.

5. The method of claim 4, wherein said solving all constraints for each of the feasible candidate binding solutions to determine the optimal solution comprises:

associating each of the piecewise linear approximations and the constraints for each feasible candidate binding solution in a linear program; and
solving the linear program to determine the optimal solution, wherein the optimal solution produces a minimal delay value for the subsystem and provides an optimal delay value for each of the datapath blocks.

6. A computer-readable medium having stored therein a computer program for automatically determining optimal design parameters of a subsystem to meet design constraints, the subsystem comprising a plurality of circuits, said computer program, when executed:
performs a parameter-delay curve optimization of the subsystem design parameters to determine the optimal design parameters, wherein the parameter-delay curve is selected from the group comprising power-delay curves and area-delay curves; and
wherein performing a parameter-delay curve optimization of the subsystem design parameters to determine the optimal design parameters comprises:
receiving a macro graph description of the subsystem;
extracting all possible paths through the macro graph;
generating all possible candidate binding solutions for the macro graph;
determining which of the possible candidate binding solutions are feasible;
generating constraints for each of the feasible candidate binding solutions; and
solving all constraints for each of the feasible candidate binding solution to determine the optimal solution; and
wherein said extracting all possible paths through the macro graph comprises:
determining each unique pathway from each input datapath block to each output datapath block in the macro graph; and
wherein said generating all possible candidate binding solutions for the macro graph comprises:
determining an implementation for each datapath block in a pathway; and
associating each of the datapath blocks into a candidate binding solution for the pathway; and
wherein said associating each of the datapath blocks into a candidate binding solution for the pathway comprises:
creating a piecewise linear approximation for each feasible candidate binding solution; and
wherein the piecewise linear approximation includes either of the following representative expressions:

$$a_{i,11}A_i + a_{i,21}D_i \geq 1$$

$$a_{i,12}A_i + a_{i,22}D_i \geq 1$$

$$\ldots$$

$$a_{i,1r}A_i + a_{i,2r}D_i \geq 1,$$

or $$a_{i,11}A_i + a_{i,21}P_i \geq 1$$

$$a_{i,12}A_i + a_{i,22}P_i \geq 1$$

$$\ldots$$

$$a_{i,1r}A_i + a_{i,2r}P_i \geq 1.$$

7. The computer-readable medium of claim 6, wherein said determining all feasible candidate binding solutions comprises:

obtaining a first parameter-delay curve for each of the datapath blocks in the candidate binding solution;

combining values from the first parameter-delay curves for the datapath blocks; and comparing the combined values against a delay constraint value, wherein the candidate binding solution is feasible if the combined values are not greater than the delay constraint value.

8. The computer-readable medium of claim 7, wherein said delay constraint value comprises:

a sum of each specified datapath block delay constraint value for the pathway.

9. The computer-readable medium of claim 6, wherein said generating constraints for each of the feasible candidate binding solutions comprises:

creating constraints for each of the feasible candidate binding solutions using a specified delay.

10. The computer-readable medium of claim 9, wherein said solving all constraints for each of the feasible candidate binding solutions to determine the optimal solution comprises:

associating each of the piecewise linear approximations and the constraints for each feasible candidate binding solution in a linear program; and solving the linear program to determine the optimal solution, wherein the optimal solution produces a minimal delay value for the subsystem and provides an optimal delay value for each of the datapath blocks.

11. A method for automatically determining an optimal delay allocation for datapath blocks of a subsystem, the subsystem comprising a plurality of circuits, the method comprising:

receiving a macro graph description of the subsystem;

extracting all possible paths through the macro graph;

generating all possible candidate binding solutions for the macro graph;

determining which of the possible candidate binding solutions are feasible;

generating constraints for each of the feasible candidate binding solutions; and solving all constraints for each of the feasible candidate binding solution to determine the optimal solution; and wherein said extracting all possible paths through the macro graph comprises:

determining each unique pathway from each input datapath block to each output datapath block in the macro graph; and wherein said generating all possible candidate binding solutions for the macro graph comprises:

determining an implementation for each datapath block in a pathway; and associating each of the datapath blocks into a candidate binding solution for the pathway; and wherein said associating each of the datapath blocks into a candidate binding solution for the pathway comprises:

creating a piecewise linear approximation for each feasible candidate binding solution; and wherein the piecewise linear approximation includes either of the following representative expressions:

$$a_{i,11}A_i + a_{i,21}D_i \geq 1$$

$$a_{i,12}A_i + a_{i,22}D_i \geq 1$$

$$\ldots$$

$$a_{i,1n}A_i + a_{i,2n}D_i \geq 1,$$

or $$a_{i,11}A_i + a_{i,21}P_i \geq 1$$

$$a_{i,12}A_i + a_{i,22}P_i \geq 1$$

$$\ldots$$

$$a_{i,1n}A_i + a_{i,2n}P_i \geq 1.$$

12. The method of claim 11, wherein said determining all feasible candidate binding solutions comprises:

obtaining a first parameter-delay curve for each of the datapath blocks in the candidate binding solution;

combining values from the first parameter-delay curves for the datapath blocks; and comparing the combined values against a delay constraint value, wherein the candidate binding solution is feasible if the combined values are not greater than the delay constraint value.

13. The method of claim 12, wherein obtaining the first parameter-delay curves comprises:

selecting the first parameter-delay curve for each of the datapath blocks from the group consisting of power-delay curves and area-delay curves.

14. The method of claim 11, wherein said generating constraints for each of the feasible candidate binding solutions comprises:

creating constraints for each of the feasible candidate binding solutions using a specified delay.

15. The method of claim 11, wherein said solving all constraints for each of the feasible candidate binding solutions to determine the optimal solution comprises:

associating each of the piecewise linear approximations and the constraints for each feasible candidate binding solution in a linear program; and solving the linear program to determine the optimal solution, wherein the optimal solution produces a minimal delay value for the subsystem and provides an optimal delay value for each of the datapath blocks.

* * * * *

UNITED STATES PATENT AND TRADEMARK OFFICE
CERTIFICATE OF CORRECTION

PATENT NO. : 6,327,552 B2  Page 1 of 1
DATED : December 4, 2001
INVENTOR(S) : M. Nemani et al.

It is certified that error appears in the above-identified patent and that said Letters Patent is hereby corrected as shown below:

Column 4,
Line 25, change "1 10" to -- 110 --.

Column 8,
Line 52, change "m" to -- m --.

Column 12,
Line 21, delete "Intel".

Column 13,
Line 21, delete "illustrating" (second occurrence)
Line 41, change "examlary" to -- examplary --.

Column 14,
Line 31, change "abetter" to -- a better --.
Line 43, delete "to be".

Signed and Sealed this

Twenty-eighth Day of January, 2003

JAMES E. ROGAN
*Director of the United States Patent and Trademark Office*